United States Patent Office 3,652,596
Patented Mar. 28, 1972

3,652,596
PRODUCTION OF UNSATURATED CARBOCYCLIC KETONES
John H. Fried, Palo Alto, Calif., assignor to Syntex Corporation, Panama, Panama
No Drawing. Continuation-in-part of applications Ser. No. 687,502, Dec. 4, 1967, and Ser. No. 747,465, July 25, 1968. This application Nov. 4, 1968, Ser. No. 773,320
Int. Cl. C07d 13/04
U.S. Cl. 260—340.9       7 Claims

ABSTRACT OF THE DISCLOSURE

Preparation of α,β-unsaturated carbocyclic ketones by reacting an enol lactone with a carbanion generated by treatment of a methylphosphonate or a mono-substituted methylphosphonate with base.

---

This is a continuation-in-part of U.S. applications Ser. Nos. 747,465 and 687,502, filed July 25, 1968 and Dec. 4, 1967, respectively.

The present invention relates to the production of unsaturated carbocyclic ketones.

More particularly, this invention relates to a novel process which has general utility for the conversion of enol lactones into α,β-unsaturated carbocyclic ketones.

The expression "enol lactone," as used herein, refers to an unsaturated lactone having α,β-ethylenic unsaturation in respect to the heterocyclic oxygen atom. The expression "α,β-unsaturated carbocyclic ketone," as used herein, refers to a carbocyclic ketone having α,β-ethylenic unsaturation in respect to the keto group.

Prior to the present invention, enol lactones were converted into α,β-unsaturated carbocyclic ketones by a two-step process which involved reacting the enol lactone with about one equivalent of a Grignard reagent, for example, methyl-magnesium chloride, to open the lactone ring and thereafter the thus-obtained diketonic intermediate product was cyclized by treatment with acid or alkali to obtain the carbocyclic ketone. See, for example, U.S. Pats. 3,057,907 and 3,321,489 and French Pat. 1,359,675. In addition to the disadvantage that the conversion of enol lactones into carbocyclic ketones requires at least two steps, prior methods are often difficult to control, unsuitable for 5-membered ring systems, and of very narrow utility in that the α,β-unsaturated carbocyclic ketones obtainable are very limited.

A primary object of the present invention, therefore, is to provide a process for the production of α,β-unsaturated carbocyclic ketones from enol lactones which overcomes the aforementioned disadvantages. Another object of the present invention is to provide a process for the production of α,β-unsaturated carbocyclic ketones which is economical and simple to operate but yet of great flexibility or adaptability in respect to the type of α,β-unsaturated carbocyclic ketone that can be produced. Another object of this invention is to provide a single-step process for the production of α,β-unsaturated carbocyclic ketones. Still another object of the present invention is to provide a process for the production of α,β-unsaturated carbocyclic ketones which is useful in the total synthesis of steroids and to novel intermediates therefor. Other objects, advantages and meritorious features of the present invention will become apparent as the invention is described in more detail hereinafter.

In accordance with the foregoing objects of the present invention, there has been discovered a very versatile process for the production of α,β-unsaturated carbocyclic ketones which comprises reacting, under substantially anhydrous conditions in an organic solvent inert to the reaction, an enol lactone with a carbanion generated by the reaction of base with a phosphonate selected from the group consisting of methylphosphonates and mono-substituted methylphosphonates.

The process of the present invention is applicable to the conversion of enol lactones into α,β-unsaturated carbocyclic ketones in general. The enol lactone can be either a monocyclic enol lactone or a polycyclic compound such as bicyclic, tricyclic and tetracyclic enol lactones depending upon the α,β-unsaturated carbocyclic ketone desired to be obtained. The process of the present invention is particularly suitable for enol lactone starting materials wherein the heterocyclic ring thereof contains at least 5 members and mono-ethylenic unsaturation. The enol lactones which can be converted into α,β-unsaturated carbocyclic ketones by the process of this invention are too numerous to list. Exemplary of the monocyclic and polycyclic enol lactones which can be used in the process of the present invention are α,α,γ-trimethylbut-2-enolide,
Δ⁴-valeryl lactone,
isocoumarin,
3-methyl-6,8-dimethoxyisocoumarin,
3-phenylisocoumarin,
3-benzoyl-7,8-dimethoxyisocoumarin,
3-chloroisocoumarin,
benzal phthalide,
5,6,7-trimethoxyisocoumarin,
δ-lactone of 1β-hydroxy-2β-methyl-2α-(2'-carboxyethyl)-3-hydroxycyclopent-3-ene,
δ-lactone of 1β-hydroxy-4-(2'-carboxyethyl)-5-hydroxy-7aβ-methyl-3aα,4β,7,7a-tetrahydroindane,
4-oxa-17β-acetoxyandrost-5-en-3-one,
3-ethoxy-17-oxa-D-homoestra-1,3,5(10),15-tetraen-17-one,
4-oxacholest-5-en-3-one,
17,20;20,21-bismethylenedioxy-4-oxa-11β-hydroxypregn-5-en-3-one, and
3-methoxy-16-oxaestra-1,3,5(10),8,14-pentaen-17-one.

The phosphonates which are useful in the production of α,β-unsaturated carbocyclic ketones in accordance with the process of the present invention are the methylphosphonates and mono-substituted methylphosphonates. Methylphosphonates and mono-substituted methylphosphonates useful in the present invention are illustrated by the following Formulas A and B, respectively:

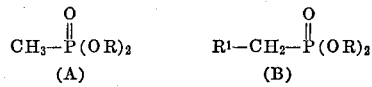

wherein R is selected from the group consisting of substituted and unsubstituted, saturated and unsaturated, aliphatic, carbocyclic and carbocyclic-aliphatic radicals and R¹ is selected from the group consisting of substituted and unsubstituted, saturated and unsaturated, aliphatic, carbocyclic and carbocyclic-aliphatic radicals.

Phosphonates of Formula A and B above can be prepared for example, by the reaction of a di-substituted phosphite (C) with an organic halide or sulfonate of the Formulas D and E, respectively, in the presence of a base, e.g. sodium hydride,

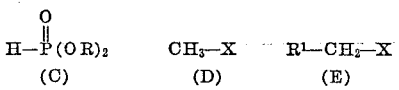

In the above formulas, R and $R^1$ are as defined above and X is chloro or bromo or $OSO_2R'$, wherein R' is alkyl or aryl. The formation of the phosphonates can be carried out in inert solvents such as ether, tetrahydrofuran, monoglyme, diglyme, or dioxane and preferably in an oxygen-free atmosphere. The method of preparing the phosphonates is not part of the present invention. A suitable procedure for the formation of methylphosphonates and mono-substituted methylphosphonates useful in the present invention is to react a di-substituted phosphite of Formula C with an organic halide or sulfonate of Formulas D and E in an inert solvent in the presence of about one equivalent of a base such as sodium hydride under an inert atmosphere at a temperature of about $-10°$ C. to about room temperature. Other methods are described in, for example, U.S. Pat. 2,754,319.

While the methlphosphonates and mono-substituted methylphosphonates which can be employed in the process of the present invention are too numerous to list here, they can be exemplified by the following:

dimethyl methylphosphonate
dimethyl ethylphosphonate
diethyl benzylphosphonate
diethyl methylphosphonate
dicyclohexyl methylphosphonate
diphenyl methylphosphonate
di-(n-butyl) methylphosphonate
dibenzyl methylphosphonate
diethyl methylphosphonate
diethyl 4,4-dimethoxybutylphosphonate
diethyl 4,4-ethylenedioxypentylphosphonate
dimethyl 4,4-dimethoxy-3-methylbut-2-enylphosphonate
diethyl 4-chloropent-3-enylphosphonate
diethyl 4-(tetrahydropyran-2'-yloxy)-pentylphosphonate
diethyl 4,4-ethylenedioxy-3-methylpentylphosphonate
di(methoxyethyl) methylphosphonate
di(2-ethylhexyl) methylphosphonate
di(n-octyl) ethylphosphonate
di(ethoxyethyl) methylphosphonate In the practice of the process of the present invention, a phosphonate of Formula A or B is reacted with a base to generate the corresponding carbanion of the Formulas A' and B', respectively:

Because of the general instability of the phosphonate carbanion, it is necessary that the reaction between the phosphonate and base be carried out at low temperatures of the order of about $-150°$ C. to about $-20°$ C., preferably about $-100°$ C. to about $-40°$ C. After formation of the carbanion is complete, the low temperature of the reaction mixture is maintained during the addition of the enol lactone and thereafter the cooling means removed or otherwise raising the reaction temperature to about room temperature. Suitable bases for generating the carbanion include organo alkali metal compounds such as n-butyl lithium, phenyl lithium, methyl sodium, sodium acetylide, methyl potassium, methyl lithium, tolyl lithium, methyl potassium lithium pyridide, and the like; alkali metal hydrides such as sodium hydride, potassisum hydride or lithium hydride; alkali metal amides such as sodamide, and the like.

In practicing the conversion of an enol lactone into the corresponding α,β-unsaturated carbocyclic ketone in accordance with the process of the present invention, the reaction is carried out using about equal molar amounts of the phosphonate, base and enol lactone. More than one molar equivalent of the phosphonate and base can be used but it is generally disadvantageous to do so because the excess reagent may react further with the carbonyl group of the desired carbocyclic ketone. Thus, it is preferred to use about one molar equivalent of the phosphonate and base or a modest excess of each such as up to about 1.2 molar equivalents. Any organic solvent can be used for the reaction medium so long as it is inert to the reaction and liquid at the reaction temperature being used. Suitable organic solvents include ether, tetrahydrofuran, dioxane, monoglyme, diglyme, and the like. The reaction between the carbanion and enol lactone generally goes to completion in from about 0.5 hour to about 48 hours depending upon such factors as temperature and the relative reactivity of the carbanion and the enol lactone. The reaction temperature can vary from about $-150°$ C. to about room temperature, preferably about $-100°$ C. to about room temperature depending upon such factors as the stability of the carbanion, the relative reactivity of carbanion and enol lactone being reacted and the time in which it is desired to complete the reaction. After formation of the carbanion is complete and the enol lactone has been introduced, the reaction mixture can be permitted to rise to about room temperature in order to complete the reaction in a shorter period of time. Depending upon the stability of the particular carbanion being used, the reaction mixture can be heated above room temperature, for example, reflux temperature, if still shorter reaction times are desired. However, because of the general instability of the carbanion, the reaction between the phosphonate and base must be carried out at low temperatures of the order of about $-150°$ C. to $-20°$ C.

There is formed an intermediate phosphonate which in some cases can also be isolated, if desired, or the reaction continued without interruption to form the α,β-unsaturated carbocyclic ketone. As shown more fully hereinafter, whether an intermediate phosphonate is formed that can be isolated is dependent upon the reactivity of the particular phosphonate carbanion and enol lactone being reacted, the solvent medium and the reaction temperature. If it is desired to isolate the intermediate phosphonate, it should generally be done before permitting the reaction to rise to warm temperature such as about 0° C. or lower by, for example, the addition of water followed by extraction with organic solvent such as ether, ethyl acetate, and the like. If it is not desired to isolate the intermediate phosphonate, the reaction can be continued without interruption or it can be continued more efficiently by the addition of a lower monohydric aliphatic alcohol such as methanol, ethanol, isopropanol, t-butanol, and the like, with or without the addition of a base such as an alkali metal alkoxide or hydroxide, for example, sodium methoxide, sodium ethoxide, sodium hydroxide, potassium hydroxide, potassium methoxide, sodium t-butoxide, and the like. The lower alcohol or an alcohol containing a base should be added after the enol lactone and phosphonate carbanion have been commingled. The addition can be made, e.g. after the reaction mixture has been allowed to rise to about 0° C. to room temperature or after the initial phosphonate has disappeared which can be followed by, e.g. thin layer chromatography. A part or all of the original solvent can first be removed, if desired, and the alcohol, with or without base, added thereafter. such as to provide at least about 10% by volume of the total amount of solvent in the reaction mixture, preferably from about 25% to 80%. When the intermediate phosphonate is isolated, the amount of base added should generally be at least 1 molar equivalent. The most advantageous amount of base is easily determinable by routine experimentation giving consideration to the enol lactone, phosphonate and solvent being employed. In the case of solvents such as diglyme and monoglyme, if it is not desired to isolate the intermediate phosphonate, it has been found advantageous to add, after the initial reaction, from about 10% to 75%, preferably 25% to 50%, by volume of the total solvent, a dipolar aprotic solvent such as hexamethylphosphoramide, dimethylformamide, dimethylacetamide, and the like. A particularly preferred reaction solvent is diglyme. In the foregoing methods, when it is not desired to isolate the intermediate phosphonate, the efficiency of the reaction is generally increased by increasing the reaction temperature, after the initial reaction, to above room temperature, such as reflux temperature. For optimum results, it is important that the reaction be conducted under as near anhydrous conditions as possible and preferably under an inert oxygen-free atmosphere such as nitrogen, argon, and the like. While the concentration of the enol lactone and carbanion does not appear to be critical, it is preferred to operate at low concentrations of the order of about two to about twenty-five percent by weight of the reaction medium. The foregoing reaction conditions are largely dependent upon the particular phosphonate, base and enol lactone employed and are presented as a guide. Provided with the foregoing and the examples hereinafter, the most advantageous or optimum conditions and proportions of the enol lactone, phosphonate and base for a particular $\alpha,\beta$-unsaturated carbocyclic ketone are easily determinable by one of ordinary skill in the art using routine experimentation.

In the case of enol lactone starting materials having other carbonyl groups present, e.g. an isolated keto group, it is preferable to introduce a protecting group prior to the reaction. In general, the phosphonate anions tend to react faster with the enol lactone group. An isolated keto group can be protected as through formation of the corresponding lower alkylenedioxy or ketal such as ethylenedioxy or propylenedioxy and the keto group regenerated by treatment with acid following completion of the reaction of the enol lactone and phosphonate anion. Alternatively, an isolated keto group can be reduced to the free hydroxy by the use of reducing agents such as lithium aluminum hydride, lithium tri(t-butoxy)-aluminum hydride or sodium borohydride and subsequently oxidized using, e.g. chromium trioxide or Jones reagent following completion of the reaction. If a free hydroxyl group is present, there may be some reaction of the hydroxy group with the carbanion and hence require that an excess of the carbanion be used. It is preferred to protect hydroxyl groups by esterification to a carboxylic ester such as acetate, benzoate, cyclopentylpropionate, mesitoate, and the like, or by etherification. Since the ester group in some cases will react with the carbanion to some extent, it is preferred to convert free hydroxyls of the starting material into an acid labile ether group such as tetrahydropyran-2-yloxy, tetrahydrofuran-2-yloxy, methoxy, ethoxy, or methoxymethylenoxy and especially t-butoxy. In general, however, the carbanion tends to react faster with the enol lactone groups.

Depending upon the particular enol lactone starting material, there is formed in some cases $\beta,\gamma$-carbocyclic ketone along with the $\alpha,\beta$-unsaturated carbocyclic ketone.

The term "lower alkyl," as used herein, refers to a saturated aliphatic hydrocarbon group, branched or straight chain, containing one to six carbon atoms. The term "monoaryl" refers to phenyl and substituted phenyl such as tolyl, chlorophenyl, methoxyphenyl, and the like. Carboxylic acyl and carboxylic acyloxy refer to an acyl group and acyloxy group, respectively, containing less than 12 carbon atoms. Typical ester groups thus include acetate, propionate, butyrate, benzoate, mesitoate, cyclopentylpropionate, enanthate, trimethylacetate, t-butylacetate, adamantoate, and the like.

The novel process of the present invention is particularly useful for the production of carbocyclic ketones admirably suited for the synthesis of steroids. One application of the process of the present invention is illustrated below in a novel route for the synthesis of 19-nor steroids wherein R' is t-butyl and $R^4$ is lower alkyl.

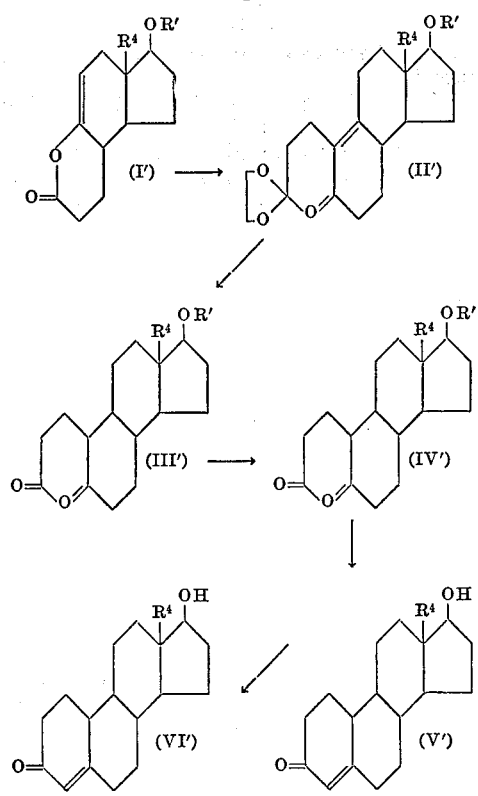

In the practice of the above process, the novel tricarbocyclic enol lactone (I') is reacted with the anion of 4-cycloethylenedioxypentylphosphonate of the following formula:

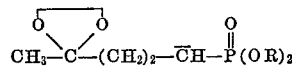

in which R is as defined above to yield the $\alpha,\beta$-unsaturated tricarbocyclic ketone (II').

The $\alpha,\beta$-unsaturated ketone (II') is treated with aqueous organic acid such as acetic acid to yield the dione (III'). The dione (III') is subjected to catalytic hydrogenation using, e.g. palladium-on-carbon or barium sulfate to yield the saturated dione (IV'). The saturated dione is cyclized using either acid to afford 19-nortestosterone (VI') or using base to yield the t-butyl ether of 19-nortestosterone (V'). Cyclization with acid is accomplished with a mineral acid such as sulfuric acid or hydrochloric acid with concomitant removal of the t-butyl group. Suitable bases for cyclization include alkali hydroxides such as sodium hydroxide. The 19 nor-steroids of Formulas V' and VI' are useful anabolic agents and intermediates for preparing other useful steroids such as 17α-ethynyl-17β-hydroxyester-4-en - 3 - one (U.S. 2,744,-122) by oxidation followed by ethynylation.

The following examples are provided to illustrate the present invention. Temperature in degrees centigrade.

EXAMPLE 1

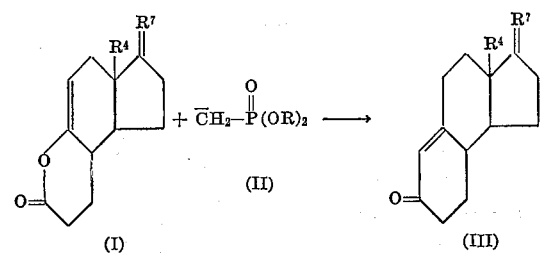

In the above formulas, R and $R^4$ are as defined above and $R^7$ is oxo or the lower alkylenedioxy or ketal thereof or the group $R^8$

in which $R^8$ is hydroxy or the carboxylic ester or labile ether thereof.

To a solution of 1 g. of dimethyl methylphosphonate in 30 ml. of dry tetrahydrofuran under nitrogen and cooled to —78°, there is added one equivalent of n-butyl lithium in hexane with stirring. After about 10 minutes at —78°, one equivalent of the tricyclic enol lactone I ($R^4$ is methyl; $R^7$ is $R^8$

in which $R^8$ is benzoyloxy) in 35 ml. of dry tetrahydrofuran is added. The reaction mixture is allowed to rise to room temperature and stand for about two hours. The reaction mixture is diluted with water and extracted with ether. The ether extracts are combined, washed with water, dried and evaporated under reduced pressure to give the tricarbocyclic ketone III ($R^4$ is methyl; $R^7$ is $R^8$

in which $R^8$ is benzoyloxy) which can be further purified by chromatography, if desired.

The tricarbocyclic ketone (III) can be used to prepare therapeutically useful 19-nor or $\Delta^{1,3,5(10)}$-steroids using the procedure of, for example, U.S. Pat. 3,150,152.

The process of Example 1 is repeated with the exception of using dimethyl ethylphosphonate in place of dimethyl methylphosphonate and there is obtained the $\alpha,\beta$-unsaturated tricarbocyclic ketones of Formula IV which can be used to prepare $\Delta^4$-androstenes or retro-steroids using the method of Velluz et al., Tetrahedron, Suppl. 8, part II, pp. 495–505 (1966).

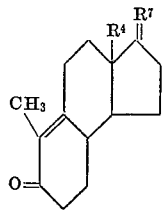

(IV)

EXAMPLE 2

To a solution of 4 g. of diethyl 4-cycloethylenedioxy-pentylphosphonate V (R is ethyl) in 50 ml. of dry monoglyme under nitrogen and cooled to about —80°, there is added one equivalent of n-butyl lithium in hexane with stirring. After about five minutes at —80°, one equivalent of the tricyclic enol lactone I ($R^4$ is methyl; $R^7$ is $R^8$

in which $R^8$ is benzoyloxy) in 75 ml. of dry monoglyme is added and the reaction mixture allowed to rise to room temperature. The reaction mixture is allowed to stand for about 2.5 hours and then diluted with water. The mixture is extracted with ether and the ether extracts combined, washed, dried and evaporated under reduced pressure to give the tricarbocyclic ketone VI ($R^4$ is methyl; $R^7$ is $R^8$

in which $R^8$ is benzoyloxy) which can be further purified by chromatography on alumina.

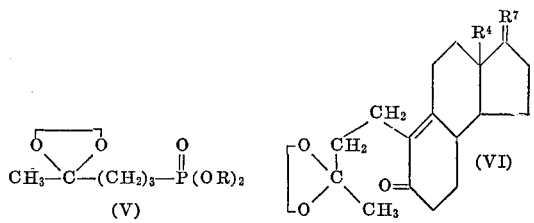

(VI)

The mono-substituted methylphosphonate (V) can be prepared using the following procedure.

To a solution of 5.5 g. of pure sodium hydride in 200 ml. of dry tetrahydrofuran under nitrogen, there is added one equivalent of dry diethyl phosphite. The mixture is cooled in an ice-bath and stirred at 0° for 1.5 hours. One equivalent of the ethylene ketal of 1-bromopentan-4-one in 60 ml. of dry tetrahydrofuran is added and the mixture stirred for 15 minutes at 0° and allowed to stand 16 hours at room temperature. The mixture is then heated under reflux for three hours, cooled and filtered. The filtrate is concentrated under reduced pressure and the concentrate taken up in ether. This mixture is shaken with saturated aqueous sodium chloride and then separated. The organic layer is separated and concentrated under reduced pressure to give diethyl 4,4-ethylenedioxypentyl-phosphonate (V) (R is ethyl) which is purified by distillation in vacuo (B.P. 115° at 0.05 mm.).

By using other phosphites, e.g. dimethyl phosphite, dibenzyl phosphite or diphenyl phosphite, in place of diethyl phospite in the above procedure, the corresponding di-substituted phosphonates are obtained.

EXAMPLE 3

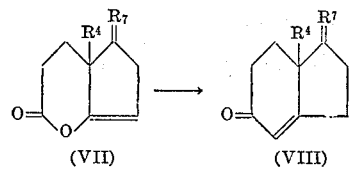

(VII)        (VIII)

To a suspension of 2 g. of dimethyl methylphosphonate in 50 ml. of dry tetrahydrofuran at —78° under nitrogen, there is added one equivalent of n-butyl lithium in hexane with stirring. After about five minutes, there is added one equivalent of bicyclic enol lactone VII ($R^4$ is methyl; $R^7$ is $R^8$

in which $R^8$ is benzoyloxy) in 50 ml. of dry tetrahydrofuran while maintaining the temperature at about —78°. The reaction mixture is allowed to warm to room temperature and to stand at room temperature for three hours. The reaction mixture is diluted with water and then extracted with ether. The ether extracts are combined, washed, dried and evaporated under reduced pressure to give the bicarbocyclic ketone VIII ($R^4$ is methyl; $R^7$ is $R^8$

in which $R^8$ is benzoyloxy) which can be further purified by chromatography or fractional distillation.

The $\alpha,\beta$-unsaturated bicarbocyclic ketones of Formula VIII are useful intermediates for the synthesis of steroids using the method of, for example, Whitehurst et al., U.S. Pat. 3,317,566.

The bicyclic enol lactones of Formula VII can be prepared using the following typical procedure or the method of French Pat. 1,496,817 (1966).

A mixture of 0.3 g. of 2-methylcyclopentane-1,3-dione, 0.33 ml. of methylacrylate and 0.1 g. of potassium t-butoxide in 200 ml. of t-butanol is allowed to stand at about 20° C. for 72 hours. The reaction mixture is washed with water, dilute sodium hydroxide and then water to neutral, dried and evaporated to give 2-methyl-2-($\beta$-carbomethoxyethyl)cyclopentane-1,3-dione which is purified by distillation.

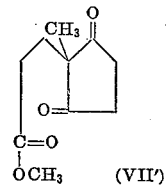

(VII')

A mixture of 5 g. of the diketoester (VII'), 100 ml. of tetrahydrofuran and 1.3 molar equivalents of lithium tri-t-butoxyaluminum hydride is heated at reflux until the hydride reagent is consumed. The reaction mixture is cooled, diluted with concentrated aqueous sodium sulfite solution and the resulting clear supernatant decanted and evaporated. The resulting residue is purified by chromatography on alumina to furnish 0.3 g. of the following alcohol:

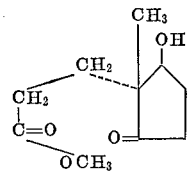

which is converted into the corresponding benzoate by treatment with benzoyl chloride in pyridine. The methyl ester is hydrolyzed to the acid which is then cyclized to furnish the enol lactone of Formula II wherein $R^4$ is methyl and $R^7$ is

in which $R^8$ is benzoyloxy.

By using 2-ethylcyclopentane-1,3-dione and 2-propylcyclopentane-1,3-dione in place of 2-methylcyclopentane-1,3-dione in the above procedure, the corresponding enol lactones wherein $R^4$ is ethyl and propyl, respectively, are obtained. The 2-lower alkylcyclopentane-1,3-diones can be prepared according to the method of U.S. Pat. 3,318,922.

EXAMPLE 4

The process of Example 3 is repeated with the exception of using an equivalent amount of phosphonate of Formula IX (R is ethyl; $R^2$ is hydrogen; $R^3$ is methyl) in place of dimethyl methylphosphonate and the substituted bicarbocyclic ketones (X) are obtained.

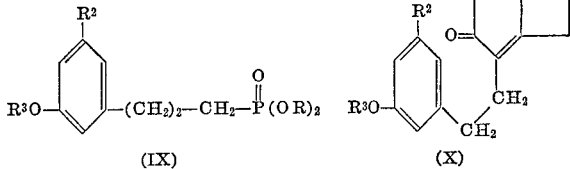

In the above formulas, R, $R^4$ and $R^7$ are as defined hereinabove, $R^2$ is hydrogen or a lower alkoxy of one to six carbon atoms and $R^3$ is lower alkyl.

By using other phosphonates of Formula IX in the above process, the correspondingly substituted α,β-unsaturated bicarbocyclic ketones of Formula X are obtained.

The phosphonates of Formula IX can be obtained by using an equivalent amount of the bromide (XI) in place of the ethylene ketal of 1-bromopentan-4-one in the procedure set out in Example 2. The bromide (XI) can be prepared from the corresponding acid by the following procedure.

Ten grams of m-methoxycinnamic acid in 100 ml. of ethanol is hydrogenated with 0.5 g. of pre-reduced 10% palladium-on-charcoal until the uptake of hydrogen ceases. The catalyst is removed by filtration and the filtrate evaporated to yield 3-(m-methoxyphenyl)propionic acid.

A solution of 5 g. of the foregoing propionic acid in 100 ml. of tetrahydrofuran is added cautiously to a boiling solution of 250 ml. of tetrahydrofuran containing 3 g. of lithium aluminum hydride. The reaction mixture is refluxed overnight with stirring and then cooled and the excess of hydride decomposed by the cautious addition of ethyl acetate and then saturated sodium sulfate. The resulting clear solution is decanted and dried over sodium sulfate. The solvent remaining is removed by distillation to give 3-(m-methoxyphenyl)propanol which is purified by distillation in vacuo. One gram of this propyl alcohol in 50 ml. of benzene is boiled with a slight excess of phosphorus tribromide until thin layer chromatography no longer indicates the presence of starting alcohol. The reaction mixture is cooled, washed with water and dilute sodium carbonate solution, dried over sodium sulfate and concentrated to dryness to give 3-(m-methoxyphenyl) propyl bromide (XI) ($R^2$ is hydrogen; $R^3$ is methyl) which is purified by distillation.

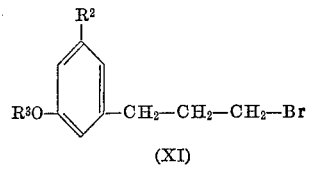

By using 3,5-dimethoxycinnamic acid in place of m-methoxycinnamic acid, the bromide (XI) in which $R^2$ is methoxy and $R^3$ is methyl is obtained.

The bicarbocyclic ketones of Formula X above can be converted into estra-1,3,5(10),8,14-pentaenes by treatment with p-toluenesulfonic acid in benzene or by the method of U.S. Pat. 3,317,566.

EXAMPLE 5

To a suspension of 4 g. of dibutyl methylphosphonate in 75 ml. of dry monoglyme at about −78° under nitrogen, there is added with stirring one equivalent of n-butyl lithium in hexane. After about 10 minutes, there is added one equivalent of 17β-acetoxy-4-oxa-androst-5-en-3-one in 75 ml. of dry tetrahydrofuran while maintaining the temperature at about −78°. The reaction mixture is allowed to warm to room temperature and then left to stand for about four hours. The reaction mixture is diluted with water and extracted with ether. The ether extracts are combined, washed, dried and evaporated to give testosterone acetate (17β-acetoxyandrost-4-en-3-one) which can be puried by chromatography.

By using diethyl ethylphosphonate in the process of this example, the correspondingly substituted tetracarbocyclic compound is obtained, i.e. 4-methyl testosterone acetate.

By using other steroidal enol lactones in the above process in place of 17β-acetoxy-4-oxaandrost-5-en-3-one as the starting material, e.g. 4-oxacholest-5-en-one, 3-ethoxy-17-oxa - D - homoestra - 1,3,5(10),15 - tetraen-17-one, 17,20; 20,21 - bismethylenedioxy - 11β - hydroxypregn-5-en-3-one, and the like, the corresponding α-β-unsaturated tetracarbocyclic ketone is obtained e.g. cholest-4-en-3-one, 3 - ethoxy - D - homoestra - 1,3,5(10),14-pentaen - 17 - one, and 17,20; 20,21 - bismethylendioxy-11β-hydroxypregn-4-en-3-one.

EXAMPLE 6

To a suspension of 2 g. of dibenzoyl methylphosphonate in 30 ml. of dry tetrahydrofuran cooled to a temperature of about −60° under nitrogen, there is added 1.1 equivalents of phenyl lithium in hexane with stirring. After about five minutes, there is added, while maintaining the temperature at about −60°, 0.95 equivalent of α,α,γ-trimethylbut-2-enolide in 40 ml. of dry tetrahydrofuran. The reaction mixture is allowed to warm to room temperature and then left to stand for about two hours. The mixture is then diluted with water and the product extracted with ether to give 3,5,5-trimethylcyclopent-2-en-1-one (XIV) which can be purified by vacuum distillation.

By using a mono-substituted methylphosphonate, for example, diethyl ethylphosphonate in the above process, the corresponding 2-substituted α,β-unsaturated cyclopentone is obtained, e.g. 2,3,4,5-tetramethylcyclopent-2-en-1-one.

EXAMPLE 7

To a solution of 5 g. of dimethyl methylphosphonate in 100 ml. of dry tetrahydrofuran cooled to about −78° under nitrogen, there is added with stirring one equivalent of n-butyl lithium in hexane. After about 10 minutes, there is added one molar equivalent of 3-methoxy-16-oxaestra-1,3,5(10),8,14-pentaen-17-one in dry tetrahydrofuran while maintaining the tempearture at about −78°. The mixture is allowed to warm to room temperature and then left to stand at room temperature for five hours. The mixture is diluted with water and then extracted with ether. The ether extracts are combined and concentrated to furnish a residue which is chromatographed on neutral alumina eluting with benzene to afford 3-methoxy-14β-estra-1,3,5(10),8,15-pentaen-17-one and 3-methoxyestra-1,3,5(10),8,14-pentaen-17-one which can be further purified by recrystallization from aqueous methanol.

0.5 g. of 3-methoxyestra-1,3,5(10),8,14-pentaen-17-one in 25 ml. of ethanol is reduced catalytically with 50 mg. of 5% palladium-on-charcoal until a molar equivalent of hydrogen is taken up. The catalyst is filtered off and the filtrate evaporated to dryness to yield the known 3-methoxyestra-1,3,5(10),8-tetraen-17-one which can be converted into estrone methyl ether by procedures outlined in Chemistry & Industry (London), 1022 (1960) or into 19-nor-Δ⁴ steroids using the procedure of, for example, U.S. Pat. 3,318,922.

By repeating the above process using other 16-oxa steroids of the Formula XV, e.g. 3-methoxy-15-methyl-16-oxaestra-1,3,5(10),6,8,14-hexaen-17-one as the tetracyclic enol lactone starting material, the corresponding steroidal ketone (tetracarbocyclic ketone) of the Formula XVI is obtained, e.g. 3-methoxy-15-methylestra-1,3,5(10), 6,8,14-hexaen-17-one and 3 - methoxy - 15 - methyl-14β-estra-1,3,5(10),6,8,15-hexaen-17-one.

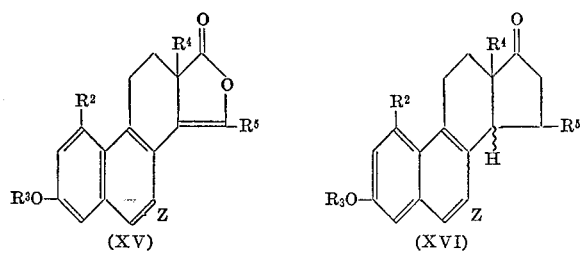

(XV)    (XVI)

In the above formulas, $R^2$, $R^3$ and $R^4$ are as defined hereinabove, $R^5$ is hydrogen or methyl and Z is a carbon to carbon single or double bond between C-6 and C-7.

The tetracarbocyclic ketones (XVI) can be converted into therapeutically useful steroids using the procedures described and referenced above. The 15-methyl substituted steroids can be used in the same manner as the corresponding 15-unsubstituted steroids.

The tetracyclic enol lactones of Formula XV can be prepared according to the method of Simpson et al., Tetrahedron Letters, 3209 (1967) or U.S. Pat. 3,309,383.

EXAMPLE 8

The process of Example 2 is repeated with the exception that the phosphonate employed is a phosphonate of Formula XVII and there are obtained the substituted tricarbocyclic ketones (XVIII) which are useful in the synthesis of valuable 2-methyl-19-nor steroids and 2-methylandrostane steroids using the procedure of, for example, Velluz et al., ibid.

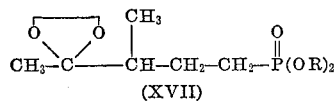

(XVII)

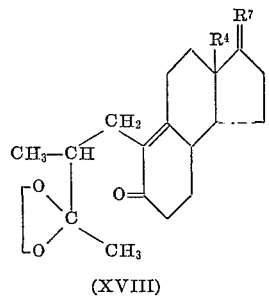

(XVIII)

The mono-substituted methylphosphonates of Formula XVII can be prepared by the procedure described in Example 2 using the ethylene ketal of 1-bromo-3-methylpentan-4-one as the starting material. This bromide starting material can be prepared according to the following procedure.

A mixture of 0.5 mole of 1-acetoxypentan-4-one and 0.5 mole of piperidine in benzene is refluxed using a water separator until no more water distills from the reaction mixture. The reaction mixture is then cooled, washed and dried to afford the 4 - piperidyl - 1 - acetoxypent-3-ene (XIX). A mixture of 5 g. of XIX in 100 ml. of dioxane is treated with an excess of methyl iodide at 20° C. for 18 hours and then heated at 70° C. for six hours. The reaction mixture is concentrated to a small volume, diluted with water and 1 - acetoxy - 3 - methylpentan-4-one isolated by extraction with ethyl acetate. A mixture of 0.5 g. of this ketone, 100 mg. of p-toluenesulfonic acid, 3 ml. of ethyleneglycol and 100 ml. of benzene is refluxed using a water separator for 24 hours. The reaction mixture is cooled and then 100 ml. of ethanol and 2 g. of potassium hydroxide are added. This mixture is refluxed for six hours, cooled, diluted with water and the corresponding ethylene ketal is isolated by extraction with ethyl acetate. A solution of 0.1 mole of the ketal in 50 ml. of dimethylformamide containing 0.1 mole of triphenylphosphine is reacted with 0.1 mole of carbon tetrabromide at room temperature for 18 hours. The mixture is diluted with water and extracted with ether. The ether extracts are combined, washed with water, dried and evaporated, the residue is chromatographed on 400 g. of alumina eluting with hexane-benzene and benzene to give the ethylene ketal of 1-bromo-3-methylpentan-4-one.

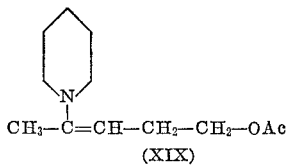

(XIX)

EXAMPLE 9

A mixture of 10 g. of 1-chloropentan-4-one, 100 ml. of ether and 1 g. of lithium aluminum hydride is allowed to stand at 20° C. for 20 hours. The reaction mixture is diluted with water and separated. The organic phase is washed with water, dried and evaporated to give 1-chloropentan-4-ol which is purified by distillation. Two ml. of dihydropyran is added to a solution of 1 g. of 1-chloropentan-4-ol in 15 ml. of benzene. About 1 ml. is removed by distillation to remove moisture and 0.4 g. of p-toluenesulfonic acid is added to the cooled solution. This mixture is allowed to stand at room temperature for four days and is then washed with aqueous sodium carbonate solution and water, dried and evaporated to yield 4-(tetrahydropyran - 2'-yloxy)-1-chloropentane which is subjected to the procedure described in Example 2 to give the phosphonate (XX).

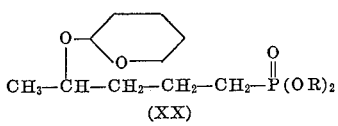

(XX)

The process of Example 2 is repeated with the exception that the phosphonate of Formula XX (R is ethyl) is used in place of the phosphonate V and there is obtained the tricarbocyclic ketones (XXI) which can be converted into 19-nor steroids.

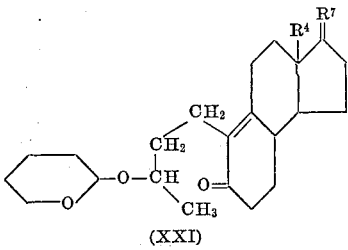

(XXI)

EXAMPLE 10

To a suspension of 4 g. of diethyl (4-chloropentyl-3-enyl)phosphonate in 50 ml. of dry monoglyme at about —78°, there is added 1.1 equivalents of butyl lithium in hexane with stirring under nitrogen. After about 10 minutes, there is added 1.1 equivalents of the tricyclic enol lactone I ($R^4$ is methyl; $R^7$ is

in which $R^8$ is benzoyloxy) in 60 ml. of dry monoglyme while maintaining the temperature at about —78°. The reaction mixture is allowed to warm to room temperature and then left to stand at room temperature for about two hours. The reaction mixture is diluted with water and then extracted with ether. The ether extracts are combined, washed, dried over magnesium sulfate and evaporated under reduced pressure to afford the α,β-unsaturated tricarbocyclic ketone XXII ($R^4$ is methyl; Ac is benzoyl) which can be purified further by chromatography on alumina.

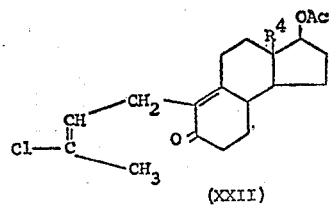

(XXII)

The tricarbocyclic ketone (XXII) is a useful intermediate for the synthesis of 19-nor steroids using the procedure of U.S. Pats. 3,050,550, 3,019,252 or 3,150,152.

The phosphonate used in the process of this example can be prepared according to the following procedure.

A mixture of 10 g. of 1-bromopentan-4-one, 100 ml. of carbon tetrachloride and 5 g. of phosphorus pentachloride is refluxed for 10 hours. The reaction mixture is then cooled, washed with dilute sodium carbonate and water, dried over magnesium sulfate and evaporated to give 1-bromo-4-chloropent-3-ene which is purified by distillation and converted into the phosphonate by the procedure described in Example 2.

EXAMPLE 11

To a suspension of 4 g. of diethyl 4,4-dimethoxybutylphosphonate in 50 ml. of dry monoglyme at about —70° under nitrogen, there is added one equivalent of phenyl lithium in hexane with stirring. After about five minutes, there is added 1.0 equivalent of the bicyclic enol lactone (VII) ($R^4$ is ethyl; $R^7$ is

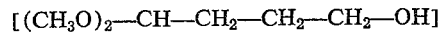

in which $R^8$ is benzoyloxy) in 50 ml. of dry monoglyme while maintaining the temperature at about —70°. The reaction mixture is allowed to warm to room temperature and then allowed to stand at room temperature for 3.5 hours. The reaction mixture is then diluted with water and extracted with ether. The ether extracts are combined, washed, dried over magnesium sulfate and evaporated under reduced pressure. The residue is chromatographed on silica gel to afford the α,β-unsaturated bicarbocyclic ketone (XXIII), ($R^4$ is ethyl; Ac is benzoyl).

A mixture of 1 g. of the above bicarbocyclic ketone, 25 ml. of dioxane and 1 ml. of 5% aqueous HCl is boiled 15 minutes. The reaction mixture is allowed to cool, poured into water and the resulting mixture separated. The organic phase is evaporated to dryness to furnish the corresponding aldehyde which is taken up in 20 ml. of acetone, cooled to 0° C. and a slight molar excess of Jones reagent (prepared by mixing 26 g. of chromium trioxide with 23 ml. of concentrated sulfuric acid and diluting with water to 100 ml.). Upon completion of the oxidation as followed by thin layer chromatography, the reaction mixture is diluted with water and then extracted with ethyl acetate. The ethyl acetate extracts are combined, washed with water, dried and evaporated under reduced pressure to afford the acid (XXIV) ($R^4$ is ethyl; Ac is benzoyl) which is a valuable intermediate for the synthesis of known 19–nor-$\Delta^4$ and $\Delta^{5(10)}$-steroids useful as therapeutic agents using the procedure of, for example, Belgium Pat. 629,251 (1963); French Pat. 1,465,400 (1965), or Velluz et al., ibid.

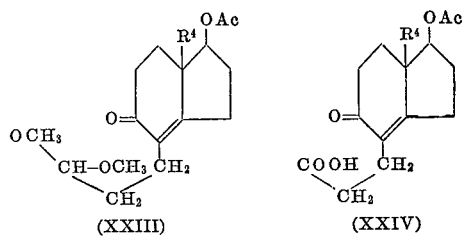

(XXIII)         (XXIV)

The diethyl 4,4-dimethoxybutylphosphonate employed in this example can be obtained according to the following procedure.

To 0.5 mole of diethylmalonate in 0.5 liter of dry benzene is added 0.5 mole of sodium hydride cautiously and the mixture stirred until hydrogen evolution ceases. Then 0.5 mole of bromoacetaldehydedimethylacetal [$(CH_3O)_2$—CH—$CH_2$—Br] in 100 ml. of benzene is added and the mixture stirred overnight followed by refluxing for two hours. The reaction mixture is cooled, washed with water and purified by vacuum distillation to give β,β-dimethoxyethylmalonic acid diethyl ester. A mixture of 5 g. of this ester in 100 ml. of ethanol containing 5 g. of sodium hydroxide is heated under reflux until evolution of carbon dioxide ceases. The reaction mixture is then saturated with carbon dioxide and evaporated to dryness under vacuum. The residue is suspended in 50 ml. of dry dimethylformamide to which is added a large excess of methyl iodide. The reaction mixture is stirred at room temperature for about 24 hours and then poured into water. The resulting mixture is extracted with ether and the ether extracts combined, washed with water and evaporated to give 4,4-dimethoxybutyric acid methyl ester which is purified by distillation. A mixture of 4 g. of this methyl ester, 50 ml. of dry tetrahydrofuran and 1.1 equivalents of lithium aluminum hydride is refluxed overnight. The reaction mixture is allowed to cool and then filtered with water. This mixture is extracted with ether and the ether extracts are combined, washed, dried and evaporated to dryness to afford 4,4-dimethoxybutanol

[$(CH_3O)_2$—CH—$CH_2$—$CH_2$—$CH_2$—OH] .

A solution of 0.1 mole of 4,4-dimethoxybutanol in 50 ml. of dimethylformamide containing 0.1 mole of triphenylphosphine is allowed to react for 18 hours with 0.1 mole of carbon tetrabromide. The mixture is diluted with water and extracted with ether. The ether extracts are combined, washed with water, dried and evaporated to a crude product which is purified by distillation to yield 4,4-dimethoxybutylbromide. This bromide is then converted into the diethyl phosphonate using the procedure described in Example 2.

EXAMPLE 12

(A) To a suspension of 2 g. of the phosphonate (XXV; R is methyl) in 50 ml. of diglyme at −78° under nitrogen, there is added one equivalent of n-butyl lithium in hexane with stirring. After about five minutes, there is added one equivalent of the bicyclic enol lactone (VII; $R^4$ is methyl, $R^7$ is ethylenedioxy) in 50 ml. of diglyme while maintaining the temperature at about −78°. The temperature is allowed to rise to about −20° and the mixture to then stand for about two hours. There is then added 35 ml. of hexamethylphosphoramide and the mixture heated at reflux for 12 hours. The mixture is allowed to cool and then is diluted with water followed by extraction with ether. The ether extracts are washed, dried and evaporated under reduced pressure to give the bicarbocyclic ketone (XXVI; $R^4$ is methyl, $R^7$ is ethylenedioxy) which is a useful intermediate for preparing enol lactones of Formula I.

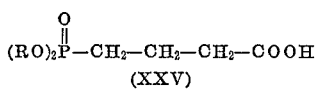

(XXV)

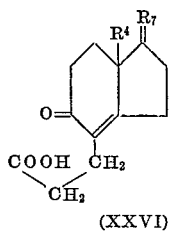

(XXVI)

In the above formulaes, R, $R^4$ and $R^7$ are as defined hereinabove.

Phosphonates of Formula XXV can be prepared as follows:

(B) To a solution of 5.5 g. of sodium hydride in 200 ml. of dry tetrahydrofuran under nitrogen, there is added one equivalent of dry dimethylphosphite. The mixture is cooled in an ice-bath and stirred at 0° for 1.5 hours. One equivalent of 4,4-dimethoxybutylbromide in 60 ml. of dry tetrahydrofuran is added and the mixture stirred for 15 minutes at 0° and allowed to stand 16 hours at room temperature. The mixture is then heated under reflux for three hours, cooled and filtered. The filtrate is concentrated under reduced pressure and the concentrate taken up in ether. This mixture is shaken with saturated aqueous sodium chloride and then separated. The organic layer is evaporated under reduced pressure to give dimethyl 4,4-dimethoxybutylphosphonate.

By using other phosphites, e.g. diethylphosphite, diphenylphosphite, dibenzylphosphite, and the like, in place of dimethylphosphite in the above procedure, the corresponding disubstituted phosphonates are obtained.

(C) A mixture of 1 g. of dimethyl 4,4-dimethoxybutylphosphonate, 25 ml. of dioxane and 1 ml. of 5% aqueous HCl is heated at reflux for 15 minutes. The mixture is allowed to cool and then poured into water and separated. The organic phase is evaporated to dryness to furnish the corresponding aldehyde. The aldehyde is stirred with four equivalents of argentic oxide in tetrahydrofuran:water (9:1) at about 25° for 14 hours. Extraction with ether:ethyl acetate followed by drying over magnesium sulfate and evaporation under reduced pressure gives the phosphonate (XXV; R is methyl).

EXAMPLE 13

Diethyl methylphosphonate (1.94 g.) suspended in 50 ml. of dry tetrahydrofuran is treated with 1.1 equivalents of butyl lithium in hexane under nitrogen at about −78°. After 10 minutes, one equivalent of benzalphthalide in 10 ml. of tetrahydrofuran is added while maintaining the temperature at about −78°. The reaction mixture is allowed to warm to room temperature and then left to stand at room temperature for three hours. The reaction mixture is diluted with water and then extracted with ether. The ether extracts are combined, washed with water, dried and the solvent removed under vacuum. The residue is chromatographed on silica eluting with methylene chloride:hexane (4:1) to afford 3-benzylind-2-en-1-one and a small amount of starting material.

By subjecting the ketone (XXI) to acid hydrolysis, e.g. dilute HCl at room temperature, the corresponding alcohol (XXI′) is obtained which is oxidized using chromium trioxide in pyridine at room temperature to the carbonyl (XXI″) which is converted into estrogens according to U.S. Pat. 3,150,152.

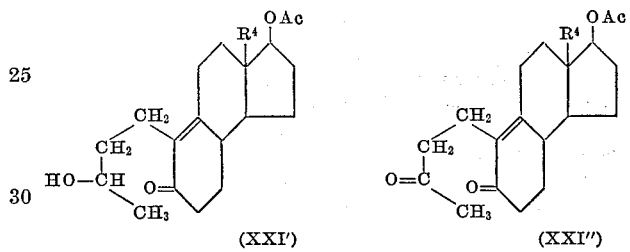

(XXI′)          (XXI″)

EXAMPLE 14

The process of Example 3 is repeated with the exception that the phosphonate (XXX) (R is ethyl) is used in place of dimethyl methylphosphonate and there is obtained the substituted bicarbocyclic ketone (XXXI) ($R^4$ is methyl; Ac is benzoyl).

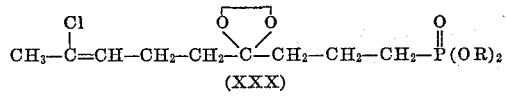

(XXX)

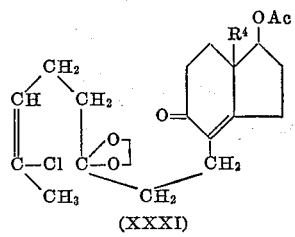

(XXXI)

The novel bicarbocyclic ketone (XXXI) is useful for the preparation of the known tricarbocyclic ketones (XXII) which can be used to prepare 19-nor steroids. Thus, hydrogenation of the bicarbocyclic ketone using, for example, 5% palladium-on-charcoal in ethanol followed by deketalization under mild condition such as 1% sulfuric acid in dioxane with refluxing for one hour furnishes the intermediate (XXXII) which can be cyclized using, e.g. a base as described by, e.g. Velluz et al., ibid, U.S. Pats. 3,102,145 and 3,150,152, or French Pat. 1,480,-247, to furnish the tricarbocyclic ketone (XXII) (Ac is hydrogen).

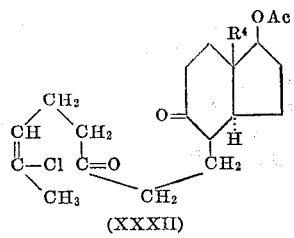

(XXXII)

The phosphonate (XXX) can be prepared using the following procedure.

A mixture of 0.5 mole of 1,3-dithiane and 300 ml. of tetrahydrofuran cooled to −30° is treated with 0.5 molar equivalents of 1.5 molar n-butyl lithium in hexane under nitrogen and stirred for 15 hours at −20°. Then 0.5 mole of the tetrahydropyranyl ether of 3-bromopropanol in 200 ml. of tetrahydrofuran is added slowly with stirring at −5° and then left for 14 hours at 0° under nitrogen. The resulting mixture is cooled to −30° and treated with an additional 0.5 molar equivalent of 1.5 molar n-butyl lithium in hexane. After 1.5 hours, 0.5 mole of 4-chloro-1-bromopent-3-ene in 200 ml. of tetrahydrofuran is added. The reaction mixture is left standing for 18 hours at 0° and then allowed to warm to room temperature for four hours. Water is added and the resulting mixture extracted with ether. The ether extracts are combined, washed with water, dried and concentrated. The resulting dialkylated thiane (XXXIII) is dissolved in methanol and stirred for two hours with 20 ml. of 1% oxalic acid solution. The reaction mixture is poured into water containing an excess of sodium carbonate solution and then extracted with ether to afford the corresponding free hydroxy compound. The free hydroxy compound is dissolved in dry ethylene glycol containing 0.5 g. of mercuric chloride. This reaction mixture is allowed to stand overnight and then heated to 60° for five hours. After cooling, water is added and the ketal (XXXIV) isolated by extraction with ether. A mixture of 2 g. of the ketal and 30 ml. of methylene chloride:pyridine (2:1) is cooled to −70° and then treated with one equivalent of tosylchloride in methylene chloride. The mixture is left standing at 0° for 18 hours and then allowed to warm to room temperature. The mixture is then diluted with water and the resulting tosylate isolated by extraction with methylene chloride and purified by chromatography on deactivated alumina. This tosylate (0.5 g.) in 25 ml. of acetone is refluxed for 24 hours with 0.5 g. of sodium iodide. After cooling, the reaction mixture is diluted with water and extracted with ether. The resulting crude iodide is treated with sodium hydride and diethyl phosphite as described in Example 2 to furnish the phosphonate (XXX) (R is ethyl).

Alternatively, the tosylate can be reacted with sodium hydride and diethyl phosphite using the procedure of Example 2 to obtain the phosphonate.

By repeating the preparation using other phosphites, e.g. dibutyl phosphite, dicyclohexyl phosphite, dimethyl phosphite or diphenyl phosphite in place of diethyl phosphite, the corresponding phosphonates are obtained.

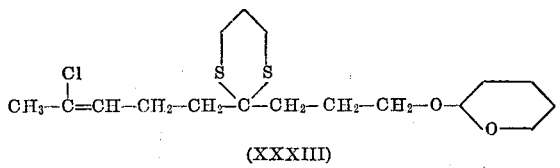

(XXXIII)

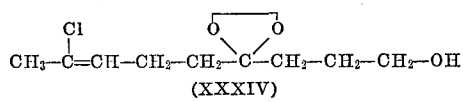

(XXXIV)

EXAMPLE 15

The process of Example 2 is repeated using as the phosphonate reagent, the phosphonate of Formula XXXV (R is ethyl) and there is obtained the tricarbocyclic ketone (XXXVI) (Ac is benzoyl) which can be converted into 19-nor steroids or androstane steroids by methods disclosed in the Journal of American Chemical Society, 82, #21, 5464 (1967).

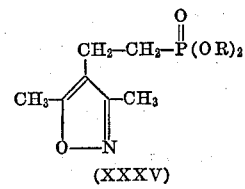

(XXXV)

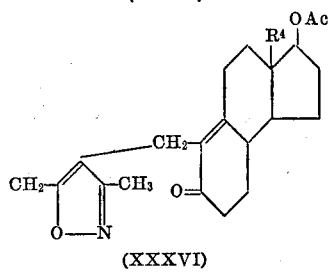

(XXXVI)

The phosphonate (XXXV) can be obtained according to the following outlined procedure.

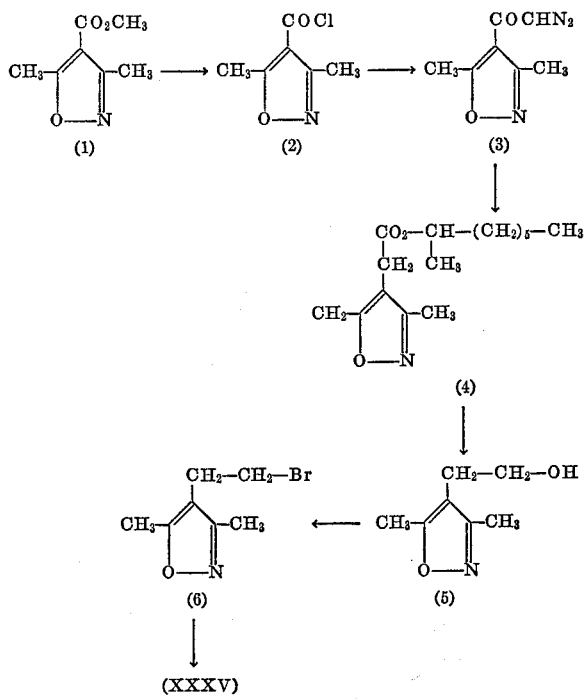

Ten grams of the isoxazole (1) is heated at reflux with 200 ml. of 1% sodium hydroxide in methanol for five hours. The reaction mixture is then acidified to pH 3 with HCl and the acidified mixture is then concentrated to a small volume under reduced pressure. Water is added and the acid isolated by extraction with ethyl acetate. The crude acid (9 g.) is taken up in methanol and treated with one equivalent of sodium methoxide. The alcohol is evaporated and the residue dried under reduced pressure. The residue is then suspended in dry benzene and treated at 0° C. with an excess of oxalyl chloride. After the evolution of gas ceases, the reaction mixture is allowed to warm to room temperature and the excess of oxalyl chloride removed by evaporation of the solvent medium to dryness. The resulting acid chloride (2) is taken up in benzene and treated with an excess of ethereal diazomethane. After the formation of the diazoketone is complete, the ether is removed and the resulting diazoketone heated under reflux in octane-2-ol until nitrogen evolution ceases. The crude product is purified by distillation and reduced with an excess of lithium aluminum hydride in 200 ml. of tetrahydrofuran under reflux. The reaction mixture is decomposed by cautious addition of ethyl acetate and the inorganic salts precipitated by the addition of concentrated sodium sulfate solution. The solution is then filtered and evaporated to yield the alcohol (5) which is purified by distillation. The alcohol (5) is then treated with phosphorus tribromide in benzene to give the bromide (6) which is converted into the phosphonate (XXXV) by the procedure described in Example 2.

EXAMPLE 16

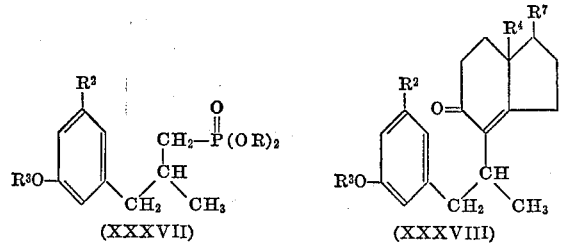

The process of Example 3 is repeated with the exception that dimethyl methylphosphonate is replaced with an equivalent amount of the phosphonate (XXXVII) (R is ethyl; $R^2$ is hydrogen; $R^3$ is methyl) and the corresponding substituted α,β-unsaturated bicarbocyclic ketones (XXXVIII) are obtained.

The bicarbocyclic ketones of Formula XXXVIII are excellent intermediates for the production of valuable 7-methyl steroids using the procedures described in Example 4.

The phosphonates of Formula XXXVII can be prepared according to the following outlined procedure wherein $R^2$, $R^3$ and X are as defined hereinabove.

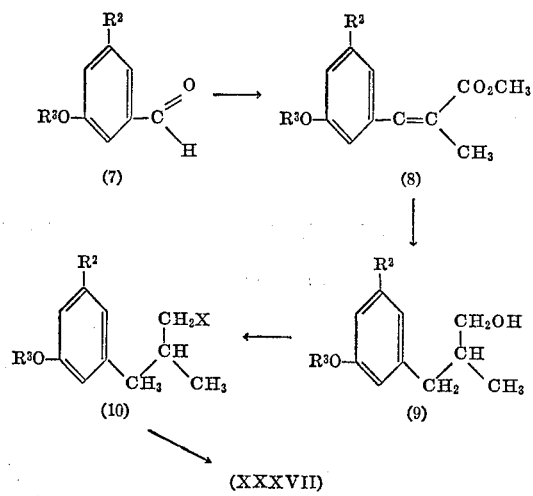

A solution of 0.6 mole of the aldehyde (7) and 0.5 mole of methyl α-bromopropionate in 80 ml. of dry benzene is added dropwise to 0.6 mole of zinc dust. After 15 ml. of the solution is added, the mixture is heated to initiate the reaction. The remaining portion of the solution is then added during one hour. The resulting mixture is cooled, washed with water, dried and then refluxed with 0.2 g. of p-toluenesulfonic acid for five hours. After cooling, the reaction mixture is washed with dilute sodium bicarbonate solution and water and then dried and purified by distillation to give (8). One gram of (8) in 25 ml. of ethanol is hydrogenated with 0.1 g. of 5% palladium-on-carbon catalyst until 1 molar equivalent of gas is taken up. The catalyst is filtered off and solvent evaporated to give 2-methyl-3-(substituted phenyl)propionic acid methyl ester. One gram of this ester in 100 ml. of tetrahydrofuran is reduced with 2 g. of lithium aluminum hydride until thin layer chromatography indicates the absence of starting ester. The reaction mixture is cooled, treated cautiously with an excess of ethyl acetate followed by saturated sodium sulfate solution. The organic layer is decanted off, dried with sodium sulfate and evaporated to give the alcohol (9) which is converted into the corresponding halide or tosylate (10) by procedures described herein (see Examples 4, 8 and 14). The halide or tosylate (10) is then converted into the phosphonate (XXXVII) using the procedure described in Example 2.

EXAMPLE 17

The process of Example 3 for the preparation of the bicyclic enol lactone (VII) is repeated with the exception that acetyl chloride and trimethylacetyl chloride is used in place of benzoyl chloride and there is obtained the corresponding carboxylic esters of (VII), that is, the acetate and trimethylacetate.

EXAMPLE 18

To 0.25 ml. of diethyl 4-cycloethylenedioxypentylphosphonate in 8 ml. of tetrahydrofuran at —78° under argon is added 1.6 molar equivalents of butyl lithium in 0.40 ml. of hexane with stirring. After 15 minutes at —78°, 0.14 g. of the enol lactone (I'; $R^4$ is methyl) in 8 ml. of cold tetrahydrofuran is added. The solution is stirred for 0.5 hour at —78° and then set aside at room temperature for six hours. The solvent is concentrated under vacuum and solution of 2 g. of potassium hydroxide, 2 ml. of water and 25 ml. of methanol is added and the mixture refluxed 1.5 hours under nitrogen. Concentration under vacuum, dilution with saturated aqueous sodium chloride and isolation with ether yields II' ($R^4$ is methyl).

To 0.18 g. of II' is added 4 ml. of acetic acid and 0.5 ml. of water and the solution heated to 80° for 1.5 hours. The solution is concentrated under vacuum and isolation with ether yields III' (R is methyl) with the t-butyl group (R') intact. The α,β-unsaturated diketone (III') in 10 ml. of 0.2% triethylamine in 95% aqueous ethanol is hydrogenated at room temperature and pressure over 5% palladium-on-charcoal until 1 equivalent of hydrogen is absorbed (about 15 minutes). The mixture is filtered and the filtrate evaporated to yield the saturated dione (IV').

A mixture of 20 mg. of the dione (IV'), 10 ml. of methanol, 1 ml. of water and 0.5 g. of potassium hydroxide is heated under reflux for 2.5 hours under nitrogen. The mixture is allowed to cool and then evaporated under vacuum. The residue is taken up in ether, washed, dried over sodium sulfate, and evaporated to dryness to yield the t-butyl ether of 19-nortestosterone (V'; $R^4$ is methyl).

A mixture of 15 mg. of the dione (IV'), 5 ml. of methanol, 1 ml. of water and 2 ml. of 37% hydrochloric acid is refluxed under nitrogen for three hours. The solvent is removed under vacuum and isolation with ether gave 19-nortestosterone (VI'; $R^4$ is methyl).

The following procedure is used for preparing the enol lactones of Formula I' wherein R' and $R^4$ are as defined therein.

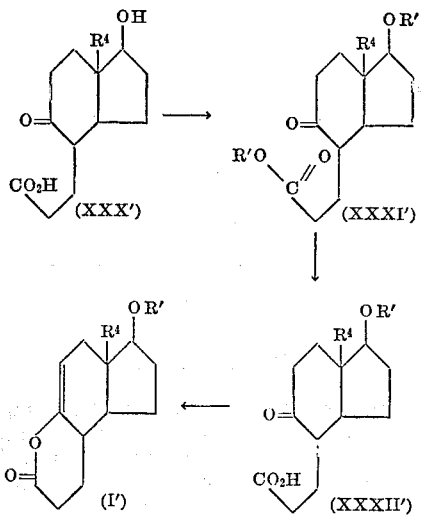

A suspension of 0.5 g. of the hydroxy acid (XXX'; $R^4$ is methyl) in 40 ml. of methylene dichloride is cooled to −70° and then 40 ml. of isobutylene and 0.6 ml. of 93% sulfuric acid are added. This reaction mixture is shaken for 17 hours in a pressure vessel. The vessel is then recooled to −70°, opened and the solution poured into aqueous sodium bicarbonate with stirring. Isolation with methylene dichloride gave the ester (XXXI′).

A mixture of 0.8 g. of the ester (XXXI′; $R^4$ is methyl), 50 ml. of water and 5 g. of potassium hydroxide is heated under reflux for 2.5 hours. Solvent is removed, water added, and extraction with ether. The aqueous phase is adjusted to pH 2 and the acid (XXXII′) isolated with ether.

A mixture of 0.24 g. of the acid (XXXII′; $R^4$ is methyl), 0.6 g. of sodium acetate and 10 ml. of acetic anhydride is refluxed under nitrogen for four hours. The reaction mixture is evaporated under vacuum and the residue treated with ether and aqueous sodium bicarbonate. Isolation with ether gave the tricyclic enol lactone (I′; $R^4$ is methyl).

The hydroxy acids (XXX′) can be prepared using the procedure of Velluz et al., ibid. or French Pat. 1,465,-400 (1965) by the reaction of the lower alkyl ester of 5-keto-6-heptenoic acid with a 2-loweralkylcyclopentane-1,3-dione (prepared by the method of U.S. Pat. 3,318,-922) in the presence of base, e.g. triethylamine followed by cyclization with acid hydrolysis, reduction and hydrogenation.

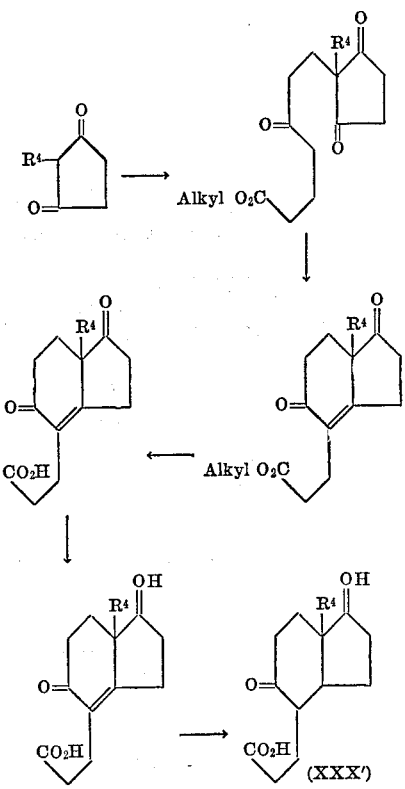

As an alternate method, the hydroxy acid can be prepared by reacting a bicyclic enol lactone of Formula VII with diethyl 4,4-dimethoxybutylphosphonate anion followed by hydrolysis, oxidation of the aldehyde to the acid and then hydrogenation with palladium-on-charcoal. The bicyclic enol lactones (VII) can be obtained according to the method of French Pat. 1,496,817 (1966) using a 2-lower alkylcyclopentane-1,3-dione and ethyl acrylate to yield ethyl β-(1′-lower alkyl-2′,5′-dioxocyclopentyl) propionate. The 2-oxo group is then modified, if desired, using conventional procedures such as forming the corresponding ethylene dioxy or forming the corresponding hydroxyl by reduction and then esterification or etherification and thereafter hydrolysis and cyclization is performed. The tricyclic enol lactones of Formula I can be similarly prepared using the method of Netherlands 6414702 (1965).

EXAMPLE 19

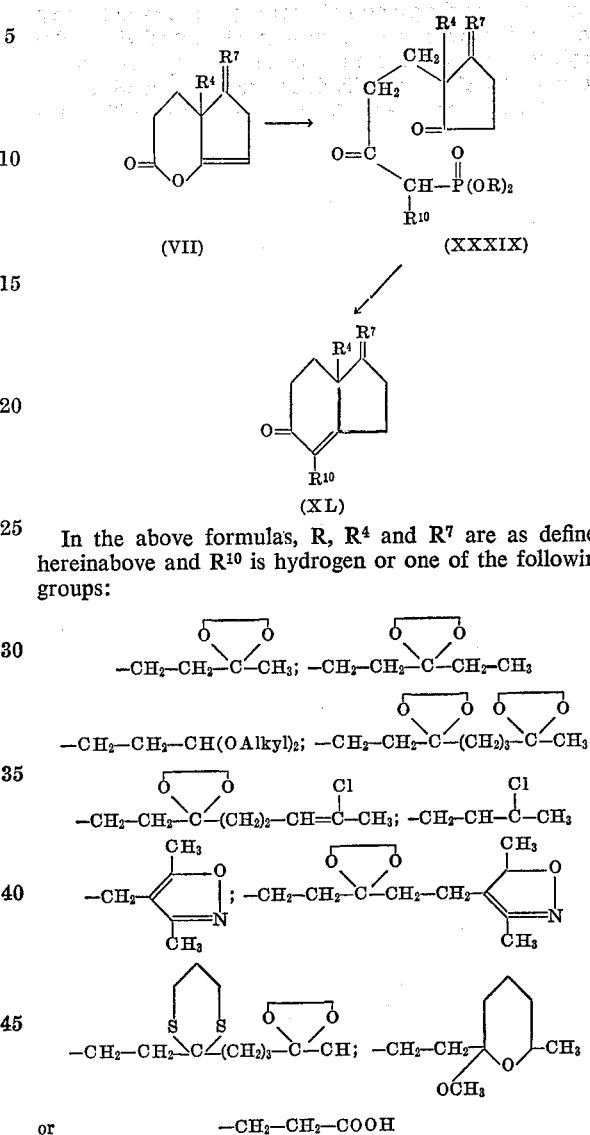

In the above formulas, R, $R^4$ and $R^7$ are as defined hereinabove and $R^{10}$ is hydrogen or one of the following groups:

$-CH_2-CH_2-\overset{O\diagup\diagdown O}{C}-CH_3$; $-CH_2-CH_2-\overset{O\diagup\diagdown O}{C}-CH_2-CH_3$ $-CH_2-CH_2-CH(OAlkyl)_2$; $-CH_2-CH_2-\overset{O\diagup\diagdown O}{C}-(CH_2)_3-\overset{O\diagup\diagdown O}{C}-CH_3$ $-CH_2-CH_2-\overset{O\diagup\diagdown O}{C}-(CH_2)_2-CH=\overset{Cl}{C}-CH_3$; $-CH_2-CH-\overset{Cl}{C}-CH_3$ $-CH_2-\overset{CH_3}{\underset{CH_3}{\diagdown}}\overset{O}{\diagup}_N$ ; $-CH_2-CH_2-\overset{O\diagup\diagdown O}{C}-CH_2-CH_2-\overset{CH_3}{\diagdown}\overset{O}{\diagup}_N$ $-CH_2-CH_2\overset{S\diagup\diagdown S}{C}(CH_2)_3-\overset{O\diagup\diagdown O}{C}-CH$; $-CH_2-CH_2-\underset{OCH_3}{\diagup O\diagdown}-CH_3$ or $-CH_2-CH_2-COOH$ (A) To a solution of 4 g. of diethyl 4-cycloethylenedioxypentylphosphonate in 50 ml. of tetrahydrofuran under nitrogen at −78°, there is added one equivalent of n-butyl lithium in hexane with stirring. After about five minutes at −78°, one equivalent of the enol lactone (VII; $R^4$ is methyl, $R^7$ is ethylenedioxy) in 75 ml. of tetrahydrofuran is added and the reaction mixture allowed to rise to about −20°. After about one hour, the mixture is diluted with water followed by extraction with ether. The ether extracts are washed, dried and evaporated under reduced pressure to yield the intermediate phosphonate (XXXIX; R is ethyl, $R^4$ is methyl, $R^7$ is ethylenedioxy, $R^{10}$ is 3-cycloethylenedioxybutyl).

(B) A solution of the intermediate phosphonate obtained in Part A in 100 ml. of ethanol and 1 equivalent of sodium ethoxide is heated at reflux for about six hours and then allowed to cool to about room temperature followed by extraction with ether. The ether extracts are washed, dried and evaporated under reduced pressure to yield the bicarbocyclic ketone (XL; $R^4$ is methyl, $R^7$ is ethylenedioxy, $R^{10}$ is 3-cycloethylenedioxybutyl) which can be further purified by chromatography.

The process of Part A of this example is repeated using dimethyl methylphosphonate to give an intermediate phosphonate of Formula XXXIX in which $R^{10}$ is hydrogen and R is methyl which is treated according to Part B of this example yielding the corresponding bicarbocyclic ketone.

By repeating the process of Part A of this example using the phosphonates shown below in place of diethyl 4-cycloethylenedioxypentylphosphonate, the corresponding intermediate phosphonates (XXXIX) are obtained which are treated according to Part B of this example yielding the corresponding bicarbocyclic ketones (XL).

in which —$OR^{12}$ is a labile ether group convertible into the corresponding hydroxy such as tetrahydrofuran-2′-yloxy, tetrahydropyran-2′-yloxy, t-butoxy, methoxy, and the like.

The process of Part A of Example 19 is repeated using the tricyclic enol lactone (I; $R^4$ is methyl, $R^7$ is ethylenedioxy) in place of the bicyclic enol lactone (VII) to yield the intermediate phosphonate (XLI; R is ethyl, $R^4$ is methyl, $R^7$ is ethylenedioxy, $R^{11}$ is 3-cycloethylenedioxy-

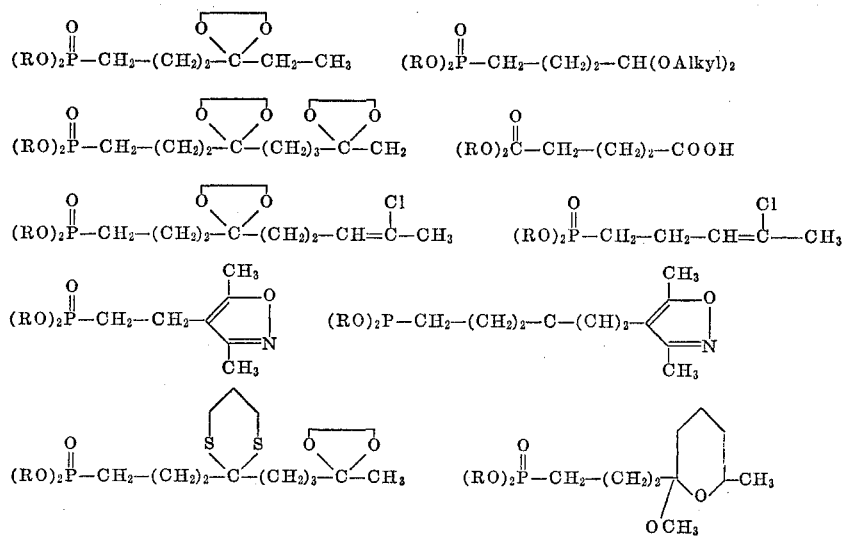

In the above formulas, R is as defined above and alkyl is lower alkyl.

EXAMPLE 20

The process of Part A of Example 19 is repeated using the phosphonates (IX) and (XXXVII) in place of diethyl 4-cycloethylenedioxypentylphosphonate to yield the intermediate phosphonates (XXXIX) wherein $R^{10}$ is

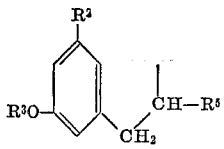

in which $R^2$ and $R^3$ are as defined above and $R^5$ is hydrogen or methyl which are treated according to Part B of Example 19 to yield the corresponding carbocyclic ketones (X) and (XXXVIII), respectively.

EXAMPLE 21

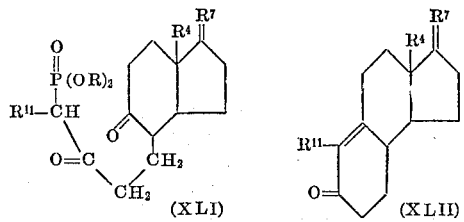

In the above formulas, R, $R^4$ and $R^7$ are as defined hereinabove and $R^{11}$ is hydrogen or methyl or one of the following groups:

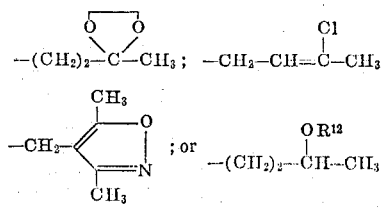

butyl) which is subjected to the procedure of Part B of Example 19 to the tricarbocyclic ketone (XLII; $R^4$ is methyl, $R^7$ is ethylenedioxy, $R^{11}$ is 3-cycloethylenedioxybutyl).

The other intermediate phosphonates and tricarbocyclic ketones of Formulas XLI and XLII, respectively, are also prepared by the foregoing procedure using the following phosphonates:

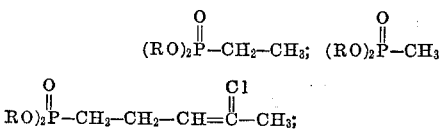

and

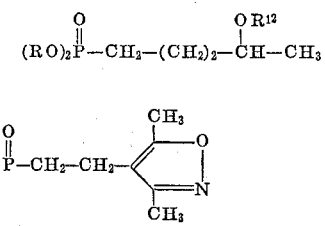

EXAMPLE 22

A mixture of 0.5 mole of 1,3-dithiane and 300 ml. of tetrahydrofuran cooled to —30° is treated with 0.5 molar equivalent of 1.5 molar n-butyl lithium in hexane under nitrogen and stirred for 15 hours at —20°. Then 0.5 mole of the tetrahydropyranyl ether of 3-bromopropanol in 200 ml. of tetrahydrofuran is added slowly with stirring at —5° and then left for 14 hours at 0° under nitrogen. The resulting mixture is cooled to —20° and treated with an additional 0.5 molar equivalents of 1.5 molar n-butyl lithium in hexane. After 1.5 hours, 0.5 mole of 4-chloro-1-bromopent-3-ene in 200 ml. of tetrahydrofuran is added. The reaction mixture is left standing for 18 hours at 0° and then allowed to warm to room temperature for four hours. Water is added and the resulting mixture extracted with ether. The ether extracts are combined, washed with water, dried and concentrated.

The resulting dialkylated thiane (XXXIII) is dissolved in methanol and stirred for two hours with 20 ml. of 1% oxalic acid solution. The reaction mixture is poured into water containing an excess of sodium carbonate solution and then extracted with ether to afford the corresponding free hydroxy compound. A mixture of 2 g. of the free hydroxy compound and 30 ml. of methylene chloride:pyridine (2:1) is cooled to —70° and then treated with one equivalent of tosyl chloride in methylene chloride. The mixture is left standing at 0° for 18 hours and then allowed to warm to room temperature. The mixture is then diluted with water and the resulting tosylate isolated by extraction with methylene chloride and purified by chromatography. The thus-obtained tosylate is dissolved in dry ethylene glycol, containing 0.5 g. of mercuric chloride. This reaction mixture is allowed to stand overnight and then heated to 60° for five hours. After cooling, water is added and the corresponding ketal isolated by extraction with ether. The ketal (0.5 g.) in 25 ml. of dry isopropanol and 0.5 g. of lithium bromide is refluxed for 12 hours. After cooling, the reaction mixture is diluted with water and extracted with ether. The resulting bromide (XLIII) is treated according to Part B of Example 12 to afford the phosphonate (XXX; R is methyl).

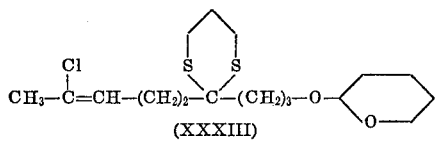

(XXXIII)

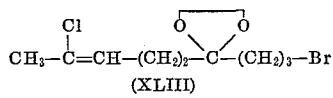

(XLIII)

EXAMPLE 23

The procedure of Example 22 is repeated with the exception that 4-chloro-1-bromopent-3-ene is replaced with the bromide (6) of Example 15 and there is obtained the phosphonates (XLIV).

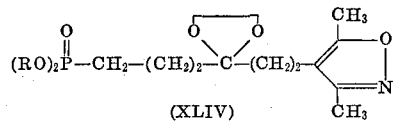

(XLIV)

EXAMPLE 24

A suspension of 0.5 g. of 1-chloropentan-4-ol in 40 ml. of methylene chloride is cooled to —70° and then 40 ml. of isobutylene and 0.6 ml. of 93% sulfuric acid are added. The mixture is shaken for 17 hours in a pressure vessel. The vessel is then recooled to —70°, opened and the solution poured into aqueous sodium bicarbonate with stirring. Isolation with methylene chloride yields the t-butyl ether of 1-chloropentan-4-ol.

A mixture of 0.5 mole of 1,3-dithiane and 300 ml. of tetrahydrofuran cooled to —30° is treated with 0.5 molar equivalent of 1.5 molar n-butyl lithium in hexane under nitrogen and stirred for 15 hours at —20°. Then 0.5 mole of the tetrahydropyranyl ether of 3-bromopropanol in 200 ml. of tetrahydrofuran is added slowly with stirring at —5° C. and then left for 14 hours at 0° under nitrogen. The resulting mixture is cooled to —30° and treated with an additional 0.5 molar equivalent of 1.5 molar n-butyl lithium in hexane. After 1.5 hours, 0.5 mole of the t-butyl ether of 1-chloropentan-4-one in 200 ml. of tetrahydrofuran is added. The reaction mixture is left standing for 18 hours at 0° and then allowed to warm to room temperature for four hours. Water is added and the resulting mixture extracted with ether. The ether extracts are combined, washed with water, dried and concentrated. The resulting dialkylated thiane (XLV) is dissolved in methanol and stirred for 0.5 hour with 20 ml. of 1% oxalic acid solution. The reaction mixture is poured into water containing an excess of sodium carbonate solution and then extracted with ether to afford the corresponding free hydroxy compound. A mixture of 2 g. of the free hydroxy compound and 30 ml. of methylene chloride:pyridine (2:1) is cooled to —70° and then treated with one equivalent of tosyl chloride in methylene chloride. The mixture is left standing at 0° for 18 hours and then allowed to warm to room temperature. The mixture is then diluted with water and the resulting tosylate isolated by extraction with methylene chloride and purified by chromatography. The tosylate is dissolved in dry ethylene glycol containing 0.5 g. of mercuric chloride. The mixture is allowed to stand overnight and then heated to 60° for five hours. After cooling, water is added and the tosylate of the ketal (XLVI) isolated by extraction with ether. The ketal (XLVI) is cyclized by treatment in methanol containing hydrogen chloride at 25° for about 12 hours to give the tosylate of XLVII which is converted into the corresponding bromide by treatment with lithium bromide in isopropanol as described above. The bromide is treated according to the procedure of Part B of Example 12 to afford the phosphonates of Formula XLVIII.

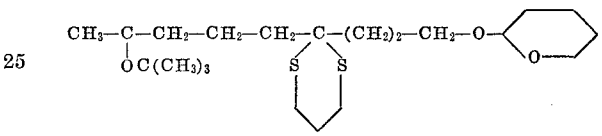

(XLV)

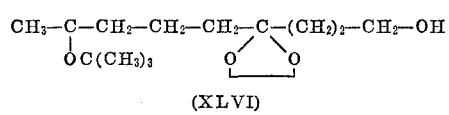

(XLVI)

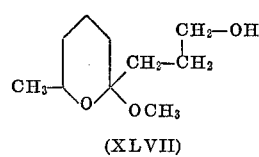

(XLVII)

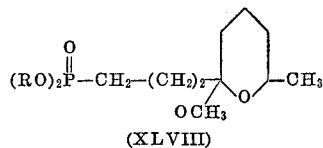

(XLVIII)

EXAMPLE 25

The ethylene ketal of ethyl 3-bromopropyl ketone (obtained by treating the ketone with ethylene glycol in benzene in the presence of p-toluenesulfonic acid) is treated with diethylphosphite using the procedure of Example 2 to afford the phosphonate (XLIX; R is ethyl).

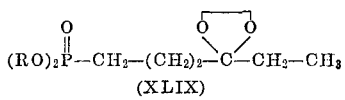

(XLIX)

The 1-halo-4-alkanone compounds can be prepared, for example, by procedures described in German Pat. No. 801,276 (December, 1950) or Jager et al., Arch. Pharm. 293, 896 (1960).

EXAMPLE 26

A mixture of 0.5 mole of 1,3-dithiane and 300 ml. of tetrahydrofuran cooled to —30° is treated with 0.5 molar equivalent of 1.5 molar n-butyl lithium in hexane under nitrogen and stirred for 15 hours at —20°. Then 0.5 mole of the ethylene ketal of methyl 3-bromopropyl ketone in 200 ml. of tetrahydrofuran is added slowly with stirring at —5° and then left for 14 hours at 0° under nitrogen. The resulting mixture is cooled to —30° and treated with an additional 0.5 molar equivalent of 1.5 molar n-butyl lithium in hexane. After 1.5 hours, 0.5 mole of 1-bromo-3-iodopropane in 200 ml. of tetrahydrofuran is added. The resulting mixture is left standing for 18 hours at 0° C. and then allowed to warm to room temperature and stand for four hours. Water is added and the resulting mixture extracted with ether. The ether extracts are combined, washed with water, dried and evaporated to yield the 1-bromo compound (L). The 1-bromo compound (L) is dissolved in dry ethylene glycol containing 0.5 g. of mercuric chloride. The mixture is allowed to stand overnight and then heated to 60° for five hours. After cooling, water is added and the corresponding diketal (LI) isolated by extraction with ether. The diketal (LI) is treated according to the procedure of Part B of Example 12 to afford the phosphonate (LII; R is methyl). The 1-bromo compound (L) can be similarly treated with dimethylphosphite using the procedure of Part B of Example 12 to afford the phosphonate (LIII; R is methyl).

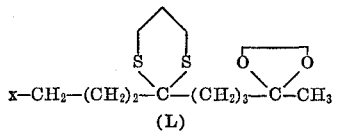
(L)

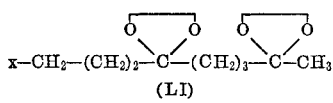
(LI)

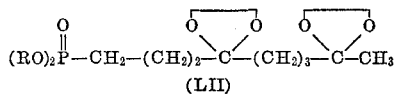
(LII)

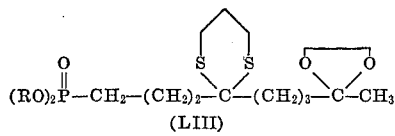
(LIII)

EXAMPLE 27

To a suspension of 2 g. of dimethyl methylphosphonate in 50 ml. of dry tetrahydrofuran at −78° under nitrogen, there is added one equivalent of n-butyl lithium in hexane with stirring. After about five minutes, there is added one equivalent of bicyclic enol lactone (VII; $R^4$ is methyl, $R^7$ is ethylenedioxy) in 50 ml. of dry tetrahydrofuran while maintaining the temperature at about −78°. The reaction mixture is allowed to warm to room temperature and to stand at room temperature for 24 hours. The reaction mixture is diluted with water and then extracted with ether. The ether extracts are combined, washed, dried and evaporated under reduced pressure to give the bicarbocyclic ketone (VIII; $R^4$ is methyl, $R^7$ is ethylenedioxy).

EXAMPLE 28

To a mixture of 2 g. of the phosphonate of Formula IX (R is ethyl, $R^2$ is hydrogen, $R^3$ is methyl) in 50 ml. of dry tetrahydrofuran at −78° under nitrogen, there is added one equivalent of n-butyl lithium in hexane with stirring. After about five minutes, there is added one equivalent of the bicyclic enol lactone (VII; $R^4$ is methyl, $R^7$ is ethylenedioxy) in 50 ml. of dry tetrahydrofuran. The reaction mixture is allowed to warm to room temperature. To the reaction mixture is added 100 ml. of ethanol and 2 g. of sodium ethoxide. The mixture is then refluxed for five hours. After cooling, the mixture is diluted with water and then extracted with ether. The ether extracts are washed, dried and evaporated under reduced pressure to give the bicarbocyclic ketone (X) in which $R^2$ is hydrogen, $R^3$ is methyl, $R^4$ is methyl and $R^7$ is ethylenedioxy.

EXAMPLE 29

To a mixture of 3 g. of the phosphonate (XXXVII; $R^2$ is methoxy, $R^3$ is methyl, R is ethyl) in 75 ml. dry diglyme at −78° under nitrogen, there is added one equivalent of n-butyl lithium in hexane with stirring. After about five minutes, there is added one equivalent of the bicyclic enol lactone (VII; $R^4$ is ethyl, $R^7$ is ethylenedioxy) in 50 ml. of dry diglyme. The reaction mixture is allowed to rise to room temperature. To the reaction mixture is added 40 ml. of hexamethylphosphoramide (hexamethylphosphorictriamide) and the mixture heated at reflux for 18 hours. After cooling, the mixture is diluted with water and extracted with ether. The ether extracts are washed, dried over magnesium sulfate, and evaporated under reduced pressure to yield the bicarbocyclic ketone (XXXVIII) in which $R^2$ is methoxy, $R^3$ is methyl, $R^4$ is ethyl and $R^7$ is ethylenedioxy.

EXAMPLE 30

The process of Example 5 is repeated with the exception that after the reaction mixture is allowed to warm to room temperature, there is added 100 ml. of methanol containing 1 g. of potassium hydroxide and the mixture heated at reflux for 10 hours to give 17β-hydroxyandrost-4-en-3-one.

EXAMPLE 31

The phosphonate (XVII; R is ethyl) is reacted with the tricyclic enol lactone (I.; $R^4$ is ethyl) using the method of Example 29 to yield the tricarbocyclic ketone (XVIII) in which $R^4$ is ethyl and $R^7$ is

wherein $R^8$ is t-butoxy.

EXAMPLE 32

The process of Example 11 is repeated with the exception that the enol lactone is an enol lactone of Formula VII wherein $R^4$ is methyl and $R^7$ is ethylenedioxy and after the reaction mixture is allowed to warm to room temperature there is added 100 ml. of methanol and 1.5 g. of sodium hydroxide and the mixture refluxed for seven hours to yield a bicarbocyclic ketone of Formula XL in which $R^4$ is methyl, $R^7$ is ethylenedioxy and $R^{10}$ is 3,3-dimethoxypropyl.

The phosphonate (XXX; R is ethyl) and enol lactone (VII; $R^4$ is ethyl, $R^7$ is ethylenedioxy) are reacted using the procedure of Example 28 to yield the bicarbocyclic ketone (XL) in which $R^4$ is ethyl, $R^7$ is ethylenedioxy and $R^{10}$ is

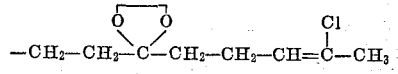

EXAMPLE 33

The phosphonate (XXXV; R is ethyl) and enol lactone (I; $R^4$ is ethyl, $R^7$ is ethylenedioxy) are reacted using the procedure of Example 28 to afford the corresponding tricarbocyclic ketone of the following formula:

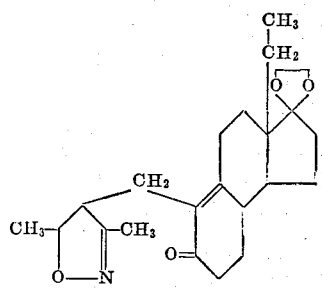

Example 19 is repeated using an enol lactone (VII) in which $R^4$ is methyl and $R^7$ is

in which $R^8$ is t-butoxy to afford the corresponding intermediate phosphonate (XXXIX) and bicarbocyclic compounds (XL) in which R and $R^{10}$ are as defined therein, $R^4$ is methyl and $R^7$ is

in which $R^8$ is t-butoxy.

Similarly, Example 20 is repeated using the t-butyl ether of enol lactone VII as the starting material.

EXAMPLE 34

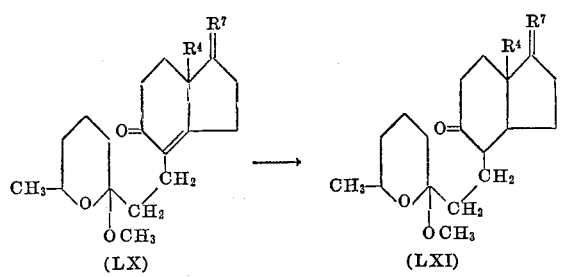

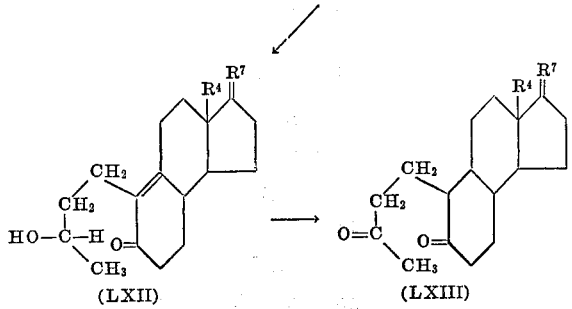

Two grams of the unsaturated bicarbocyclic ketone (LX; $R^4$ is methyl, $R^7$ is ethylenedioxy) in 25 ml. of 0.2% triethylamine and 100 ml. of 95% aqueous ethanol is hydrogenated at room temperature and room pressure over 5% palladium-on-charcoal until one equivalent of hydrogen is absorbed. The mixture is filtered and the filtrate evaporated to yield the corresponding saturated bicarbocyclic ketone (LXI).

A mixture of one gram of the saturated bicarbocyclic ketone (LXI), 100 ml. of methanol, 10 ml. of water and 20 ml. of 37% hydrochloric acid is heated at reflux for two hours under nitrogen. The solvent is removed under reduced pressure and isolation with ether affords the unsaturated tricarbocyclic diketone (LXII; $R^7$ is oxo) which is hydrogenated using the procedure described above to yield the corresponding saturated tricarbocyclic diketone which is subjected to oxidation using chromium trioxide in pyridine or Jones reagent to yield saturated triketone (LXIII).

Other compounds of Formula LX (prepared as described in Example 19) can be used in the above procedure to obtain other useful intermediates of Formula LXIII.

EXAMPLE 35

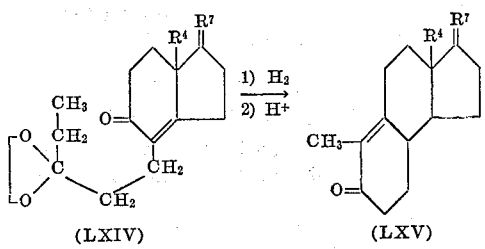

An unsaturated bicarbocyclic ketone (LXIV; $R^4$ is ethyl, $R^7$ is ethylenedioxy) is hydrogenated to the corresponding unsaturated bicarbocyclic ketone which is cyclized using hydrochloric acid according to the procedure of the previous example to afford the tricarbocyclic ketone (LXV) in which $R^4$ is ethyl and $R^7$ is oxo. The compound LXV is an intermediate for $\Delta^4$-androstenes or retro-steroids using the procedure of, for example, Netherlands 6707919 (1967).

EXAMPLE 36

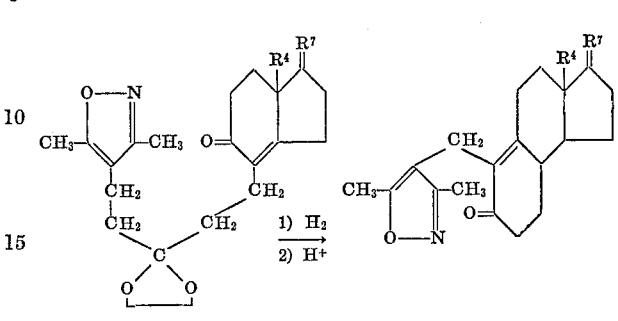

The unsaturated bicarbocyclic ketone (LXVI; $R^4$ is methyl, $R^7$ is ethylenedioxy) is hydrogenated over palladium-on-charcoal using the procedure described above to give the corresponding saturated bicarbocyclic ketone which is cyclized using acid by the procedures described above to yield the tricarbocyclic ketone (LXVII; $R^4$ is methyl, $R^7$ is oxo) which can be converted into 19-nor steroids by methods disclosed in Journal of the American Chemical Society 82, #21, 5464 (1967).

EXAMPLE 37

The bicarbocyclic ketone (LXVIII; $R^7$ is ethylenedioxy) is subjected to the procedure of Example 35 to yield the tricarbocyclic ketone (LXIX; $R^7$ is oxo).

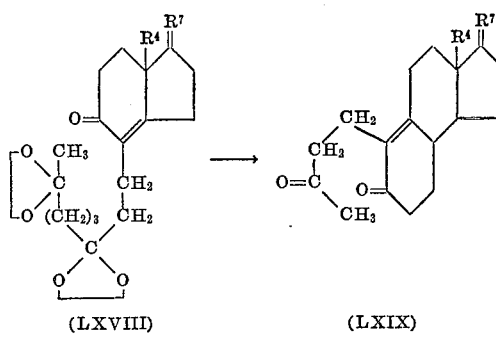

Similarly, the bicarbocyclic ketone (LXX; $R^7$ is ethylenedioxy) can be converted into the tricarbocyclic ketone (LXIX; $R^7$ is oxo).

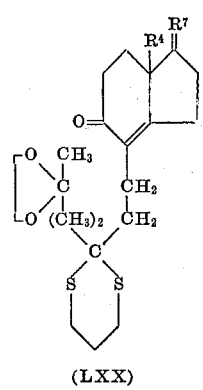

EXAMPLE 38

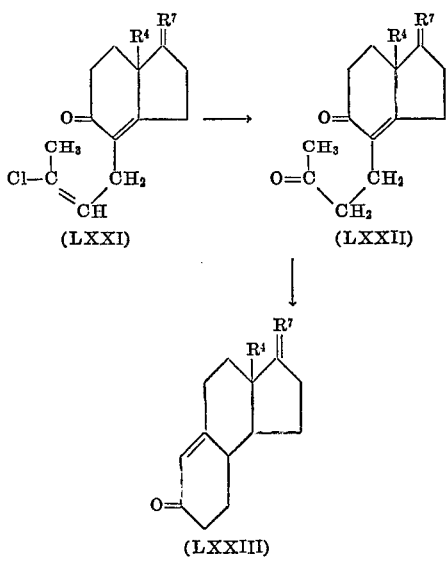

The bicarbocyclic ketone (LXXI; $R^7$ is ethylenedioxy) is treated with acid using the procedure of U.S. 3,050,550 to give the triketone (LXXII; $R^7$ is oxo) which is hydrogenated over palladium-on-charcoal and then cyclized using acid to the tricarbocyclic diketone (LXXIII).

The procedure of Example 12 is repeated with the exception that after the mixture is allowed to cool the mixture is adjusted to pH 4 and then the bicarbocyclic ketone (XXVI) is isolated as described therein.

The procedure of Example 19 is repeated using an enol lactone (VII; $R^4$ is methyl, $R^7$ is the group

in which $R^8$ is acetoxy) to yield the carbocyclic ketone (XL) in which $R^4$ is methyl, $R^7$ is the group

wherein $R^8$ is hydroxy and $R^{10}$ is as defined therein.

The term "carbocyclic," as used herein, refers to saturated carbocyclics such as cyclohexyl, and the like, and unsaturated carbocyclics (i.e. mono-aryl) such as phenyl, tolyl, trichlorophenyl, and the like. Carbocyclic-aliphatic refers to benzyl, and the like.

What is claimed is:
1. A compound selected from the group of compounds represented by the formula

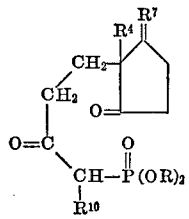

wherein
R is monoaryl, alkyl having from 1 to 8 carbons, cyclohexyl, benzyl, methoxymethyl or ethoxyethyl;
$R^4$ is lower alkyl;
$R^7$ is oxo, lower alkylenedioxy or the group

in which $R^8$ is hydroxy, a carboxylic ester thereof having less than 12 carbon atoms, or an acid labile ether thereof;

when $R^7$ is lower alkylenedioxy, $R^{10}$ is hydrogen or one of the groups:

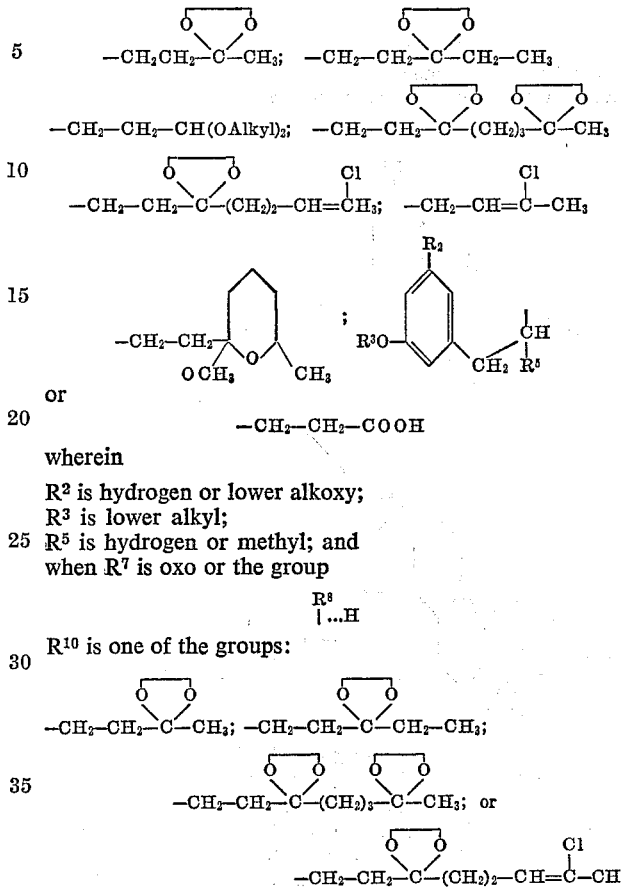

or $-CH_2-CH_2-COOH$ wherein
$R^2$ is hydrogen or lower alkoxy;
$R^3$ is lower alkyl;
$R^5$ is hydrogen or methyl; and
when $R^7$ is oxo or the group

$R^{10}$ is one of the groups:

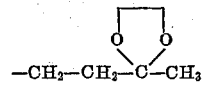

2. A compound of claim 1 wherein R is lower alkyl or phenyl.
3. A compound of claim 2 wherein $R^7$ is lower alkylenedioxy or $\overset{R}{|}...H$ wherein $R^8$ is an acid labile ether.
4. A compound of claim 3 wherein R is lower alkyl and $R^7$ is lower alkylenedioxy.
5. A compound of claim 4 wherein R is ethyl and $R^7$ is ethylenedioxy.
6. A compound of claim 5 wherein $R^4$ is methyl and $R^{10}$ is the group $-CH_2-CH_2-\overset{O\diagup\diagdown O}{\underset{|}{C}}-CH_3$ 7. A compound according to claim 1 wherein R is lower alkyl, cyclohexyl, benzyl or monoaryl.

References Cited
UNITED STATES PATENTS 3,402,181  9/1968  Erickson et al. ___ 260—340.9 X
3,506,693  4/1970  Bucourt et al. ____ 260—340.9 X ALEX MAZEL, Primary Examiner
J. H. TURNIPSEED, Assistant Examiner U.S. Cl. X.R.

260—294.3, 307 327, 340.7, 343.2, 343.3, 345.9, 397.4, 963, 468, 476, 488, 514, 586, 621